US012436094B2

United States Patent
Irwin et al.

(10) Patent No.: US 12,436,094 B2
(45) Date of Patent: Oct. 7, 2025

(54) ADJUSTABLE OPTICAL SYSTEM FOR A SPECTROGRAPH

(71) Applicant: Thermo Electron Scientific Instruments LLC, Madison, WI (US)

(72) Inventors: Julian Irwin, Madison, WI (US); Jeffrey Peter Wong, Middleton, WI (US)

(73) Assignee: THERMO ELECTRON SCIENTIFIC INSTRUMENTS LLC, Madison, WI (US)

( * ) Notice: Subject to any disclaimer, the term of this patent is extended or adjusted under 35 U.S.C. 154(b) by 190 days.

(21) Appl. No.: 18/309,390

(22) Filed: Apr. 28, 2023

(65) Prior Publication Data

US 2024/0361234 A1 Oct. 31, 2024

(51) Int. Cl.
*G01N 21/31* (2006.01)

(52) U.S. Cl.
CPC ..... *G01N 21/31* (2013.01); *G01N 2201/0633* (2013.01); *G01N 2201/0634* (2013.01)

(58) Field of Classification Search
CPC ........... G01N 21/31; G01N 2201/0633; G01N 2201/0634; G01J 3/18; G01J 3/0208; G01J 3/0237; G01J 3/0291; G01J 3/0202
See application file for complete search history.

(56) References Cited

U.S. PATENT DOCUMENTS

| | | | |
|---|---|---|---|
| 3,414,355 A | 12/1968 | Slutter et al. | |
| 5,173,742 A * | 12/1992 | Young | G01N 30/74 356/440 |
| 5,192,981 A * | 3/1993 | Slutter | G01J 3/1804 356/334 |
| 6,744,506 B2 * | 6/2004 | Kaneko | G02B 27/286 356/333 |
| 7,345,760 B2 | 3/2008 | Deck | |
| 2003/0007148 A1 * | 1/2003 | Moon | G02B 6/29398 356/334 |
| 2005/0248758 A1 * | 11/2005 | Carron | G01J 3/44 356/301 |

FOREIGN PATENT DOCUMENTS

| | | | |
|---|---|---|---|
| CN | 106225926 A | * | 12/2016 |
| CN | 108020319 A | | 5/2018 |
| EP | 1971835 B1 | | 3/2021 |
| KR | 20130067354 A | * | 6/2013 |

OTHER PUBLICATIONS

European Patent Office. Extended European Search Report for Application No. 24172362.6, dated Oct. 10, 2024 (7 pages).

* cited by examiner

*Primary Examiner* — Hina F Ayub
*Assistant Examiner* — Christina I Xing
(74) *Attorney, Agent, or Firm* — Michael Best & Friedrich LLP

(57) ABSTRACT

A spectrograph includes a base, a first optic mounted with respect to the base, a second optic mounted with respect to the base, and a third optic mounted with respect to the base. A first relative position between the first optic and the second optic is adjustable about a first pivot axis. A second relative position between the second optic and the third optic is adjustable about a second pivot axis independently from the adjustability of the relative position between the first optic and the second optic. The second pivot axis is substantially coincident with the first pivot axis, and a distance between the third optic and the second optic is fixed during adjustment of the second relative position.

20 Claims, 5 Drawing Sheets

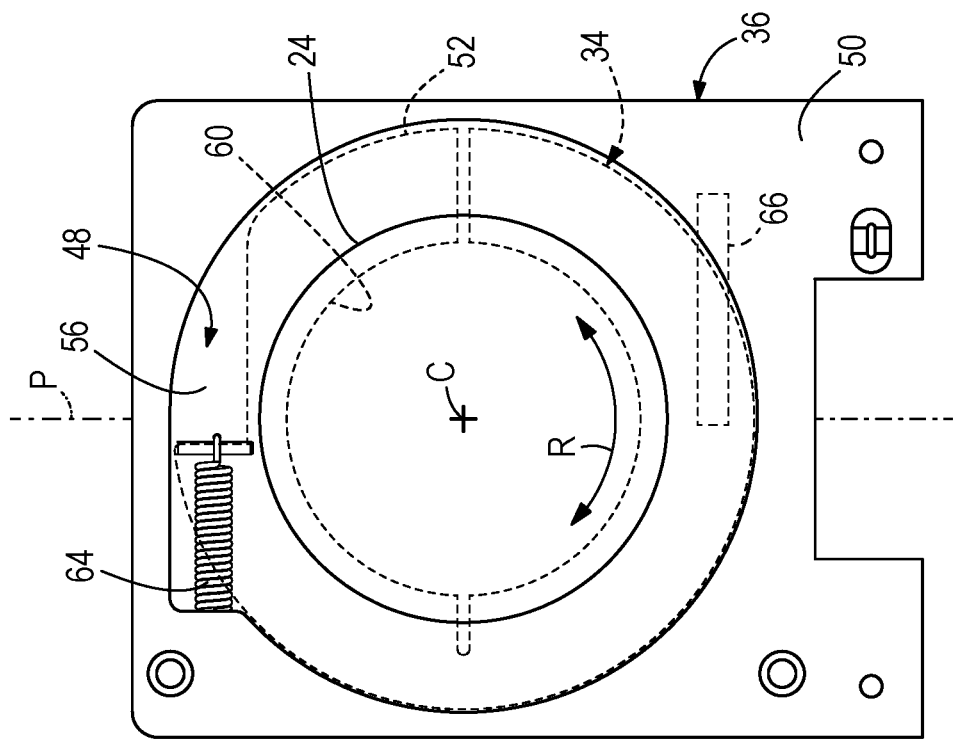
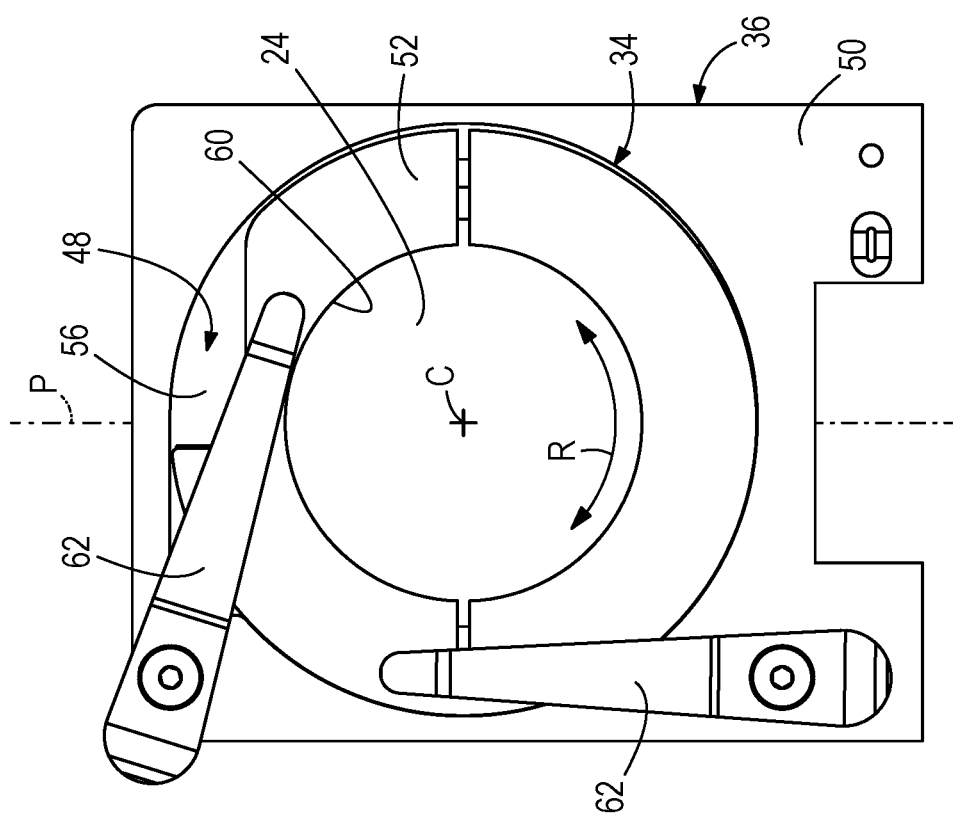

ADJUSTABLE OPTICAL SYSTEM FOR A SPECTROGRAPH

BACKGROUND

The present disclosure relates to an arrangement of optics for a scientific instrument, such as a spectrograph, and methods for aligning the optics. A spectrograph is a scientific instrument for receiving electromagnetic radiation.

SUMMARY

In one implementation, the disclosure provides a spectrograph including a base, a first optic mounted with respect to the base, a second optic mounted with respect to the base, and a third optic mounted with respect to the base. A first relative position between the first optic and the second optic is adjustable about a first pivot axis. A second relative position between the second optic and the third optic is adjustable about a second pivot axis independently from the adjustability of the relative position between the first optic and the second optic. The second pivot axis is substantially coincident with the first pivot axis, and a distance between the third optic and the second optic is fixed during adjustment of the second relative position.

In another implementation, the disclosure provides a spectrograph. The spectrograph includes a base, a collimating optic supported by the base, a dispersive optic supported by the base, and a focusing optic supported by the base. A relative position between the collimating optic and the dispersive optic is adjustable by way of a first adjustable mount configured to be movable with respect to the base. A relative position between the dispersive optic and the focusing optic is adjustable by way of a second adjustable mount configured to be movable with respect to the base independently from the first adjustable mount.

Other aspects of the disclosure will become apparent by consideration of the detailed description and accompanying drawings.

BRIEF DESCRIPTION OF THE DRAWINGS

FIG. 3 is a rear elevation view of a grating mounting system, which is a portion of the adjustable optical system shown in FIGS. 1-2.

FIG. 4 is a front elevation view of the grating mounting system shown in FIG. 3.

DETAILED DESCRIPTION

Figure 1:
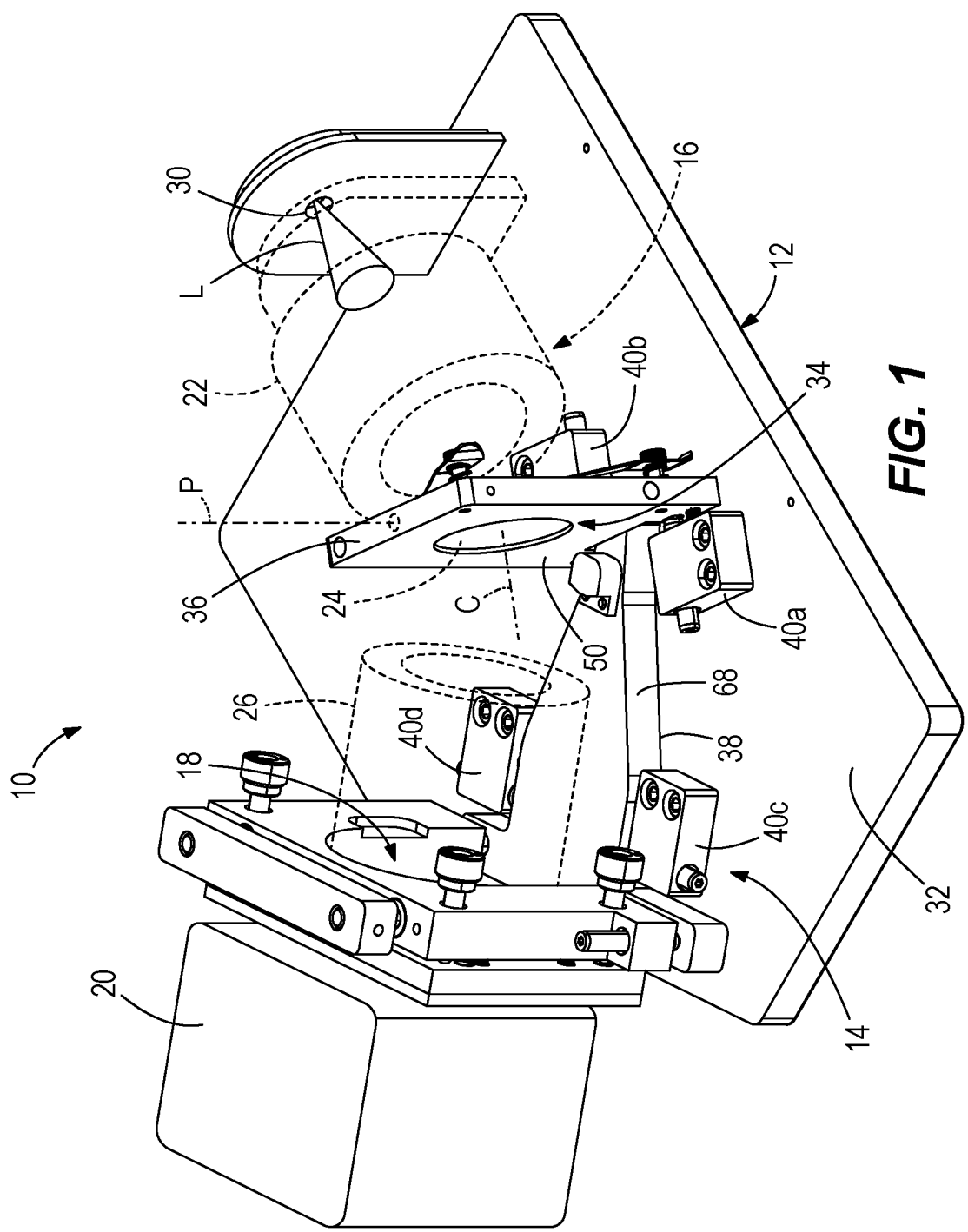
FIG. 1 is a perspective view illustrating a spectrograph having an adjustable optical system.

In a transmission spectrograph, the angle of the rulings on a diffraction grating are desirably perpendicular to the axis of the line sensor. The grating incidence angle may be finely tuned to optimize the grating efficiency. Further, the lens and camera/detector downstream of the diffraction grating are desirably aligned to the wavelength of interest dispersed by the diffraction grating, so that the wavelength of interest is centered on the lens and camera/detector. Each of these adjustments preferably involves fine angular control and small angular range.

An adjustable optical system and method for aligning the system are disclosed herein. The adjustable optical system includes a spectrograph. The spectrograph may be a part of a spectroscopic system, such as a Raman spectroscopic system. The spectrograph may receive electromagnetic radiation from a sample and generates spectroscopic data. The spectroscopic data may be used for analyzing sample composition. The optical system includes a first optic, a second optic, and a third optic mounted with respect to a base. The base may include a base plate. The first optic may be a collimating optic for directing a collimated beam towards the second optic. The second optic may be a dispersive optic, such as a diffraction grating, for spreading the collimated beam based on the wavelength. The third optic may be a detector, or a lens associated with the detector. The wavelength of interest of the dispersed beam from the second optic is centered on the third optic. The first and third optics may include one or more optical elements. The electromagnetic radiation (such as light from the sample) may enter the spectrograph via the first optic and then sequentially passes the second optic and the third optic.

In one example, the first, second, and third optics are all mounted with respect to the base. The first, second and third optics may be directly or indirectly supported by the base. In one example, the second and third optics are supported by the base. In one example, the second optic is mounted to the base via the first adjustable mount and the third adjustable mount, and the third adjustable mount is mounted to the base via the second adjustable mount. The third optic is mounted to the base via the second adjustable mount. In one example, the first optic is not directly mounted to the base. In some examples, other optical parts of the spectroscopy system may be also mounted to the base. In some examples, the base of the spectrograph may be mounted to the base of the spectroscopy system.

In one example, the second optic is pivotably mounted to the base via a first adjustable mount, wherein the second optic is rotatable around a first pivot axis normal to the base. The dispersive optic defines a central axis normal thereto. A central axis of an optic may be an axis normal to a planar surface of the optic and through an approximate center thereof. The first pivot axis intersects the central axis of the second optic. The pivot axis may be parallel and extend along the dispersive optic. The third optic is pivotably mounted to the base via a second adjustable mount. The third optic is rotatable around the second pivot axis while maintaining the distance between the third optic and the second optic. The second pivot axis does not intersect with the third optic. The first pivot axis may be substantially coincident with the second pivot axis. In one example, the first pivot axis and the second pivot axis are the same.

The dispersive optic is mounted respective to the base via an adjustable mount (e.g., a first adjustable mount). The adjustable mount may be rotated around a pivot axis normal to the base. The pivot axis may be parallel to the surface of the dispersive optic. The third optic (detector or lens associated with the detector) is mounted respective to the base via another adjustable mount (e.g., a second adjustable mount). The second adjustable mount may be a plate having an elongated shape defined by a length and a width. The third optic is mounted at one end of the second adjustable mount along the length, and the other end of the second adjustable mount along the length is pivotably mounted to the base plate substantially at the same pivot axis defined by the first adjustable mount. As such, the relative angle between the third and second optics (i.e., the angle between central axis of the third optic and the central axis of the second optic) can be adjusted by rotating the second adjustable mount relative to the pivot axis. The relative angle is adjusted while maintaining the distance between the second and third optics.

In some examples, the second optic is further supported by a third adjustable mount for rotating the second optic around its central axis. The second optic may be mounted to the second adjustable mount via the third adjustable mount. For example, the grating direction of the second optic can be adjusted via the third adjustable mount so that the grating direction defined by the second optic is perpendicular to the axis of the line sensor of the detector.

In one example, the spectrograph may be aligned by adjusting the incidence angle of light towards the second optic. The incidence angle may be adjusted by rotating the first adjustable mount relative to the pivot axis. As such, the second optic is rotated relative to the pivot axis. In some examples, the incidence angle may be adjusted by adjusting the first optic. After adjusting the incidence angle, the angular position of the third optic relative to the second optic may be adjusted by pivoting a first end of the second adjustable mount relative to a second, opposite along the length, end of the second adjustable mount, wherein the third optic is mounted to the first end and the pivot axis is on the second end.

Though a spectrograph with transmissive grating is shown in the figures, the spectrograph and method for aligning the spectrograph disclosed herein may also be used for reflection spectrograph with reflective grating.

Before any implementations of the disclosure are explained in detail, it is to be understood that the disclosure is not limited in its application to the details of construction and the arrangement of components set forth in the following description or illustrated in the following drawings. The disclosure is capable of other implementations and of being practiced or of being carried out in various ways.

Figure 2:
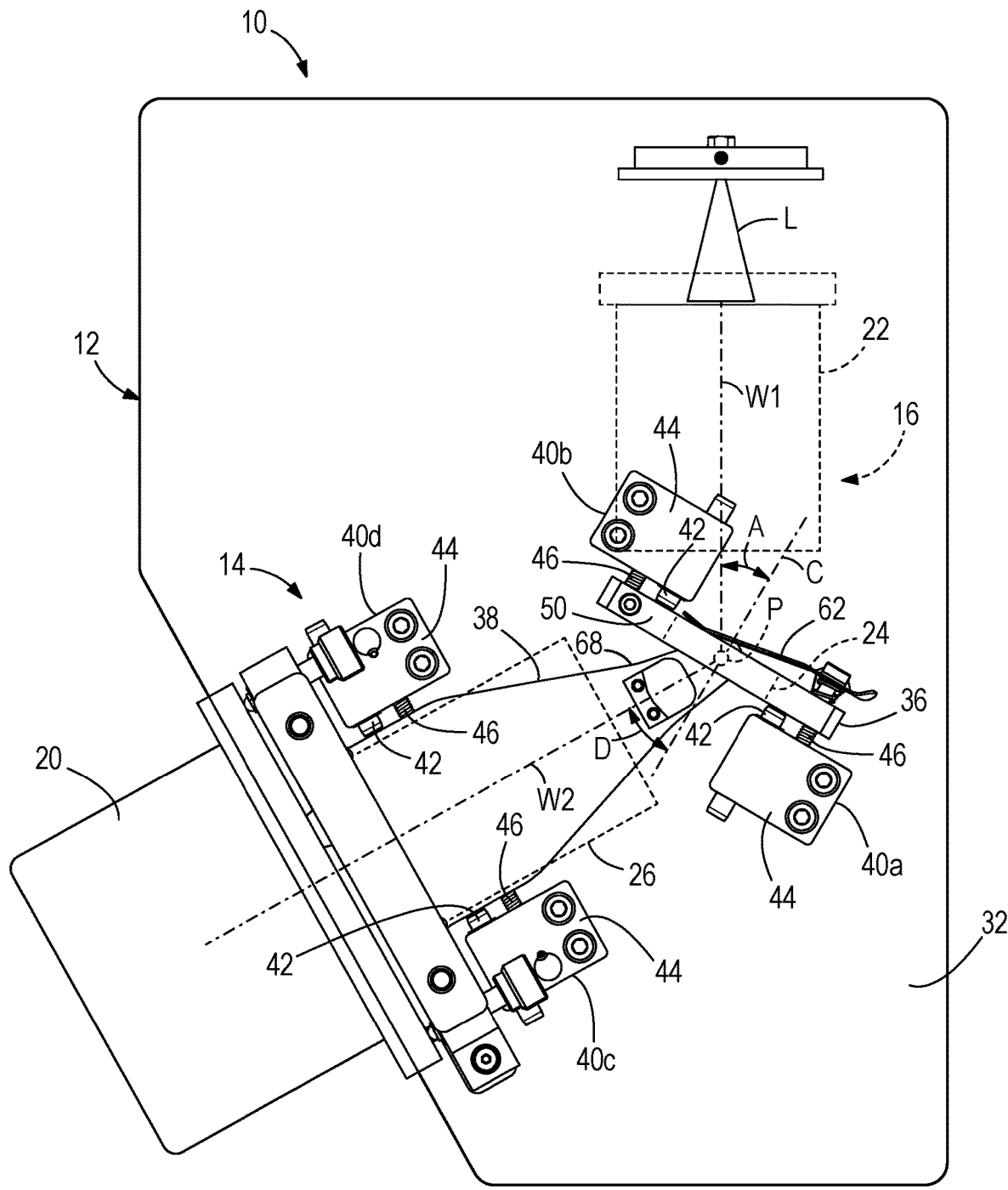
FIG. 2 is a plan view of the spectrograph shown in FIG. 1.

FIGS. 1-2 illustrate an implementation of a scientific instrument 10, such as a spectrograph, having an adjustable optical system 12. The adjustable optical system 12 may be configured for acquiring spectral data from a sample. The adjustable optical system 12 includes a mounting system 14 supporting an optical arrangement 16. The mounting system 14 allows relative movement between components (or groups of components) of the optical arrangement 16, e.g., for aligning the components of the optical arrangement 16 with respect to each other.

The optical arrangement 16 is configured to control light L and, more specifically, to cooperatively focus component wavelengths of the light L in ordered bands across an exit aperture 18 and/or a detector 20. "Light" refers to electromagnetic radiation and is not limited to a particular range of the electromagnetic spectrum. For example, "light" may include radio waves, microwaves, infrared, visible light, ultraviolet, X-rays, and gamma rays.

In some implementations, the adjustable optical system 12 may be useful for other types of optical assemblies and/or for other types of scientific instruments. The optical arrangement 16 may include any number and combination of one or more of mirrors, reflectors, lenses, dispersive optics, gratings, prisms, dielectric mirrors, detectors, filters, galvanometers, telescopes, fibers, shutters, and/or any other type of optical component for controlling the light L. Other types of scientific instruments that may employ the adjustable optical system 12 may include other types of spectrometers having other optical arrangements, telescopes, microscopes, photometers, other optical instruments, acoustic instruments, any instrument for controlling the path of any wave (not just visible light), etc.

As such, for purposes of describing the many uses for the adjustable optical system 12, the components of the optical arrangement 16 illustrated herein may be simplified as a first optic 22, a second optic 24, and a third optic 26. It should be understood that each of the first, second, and third optics 22, 24, 26 may be embodied as any of the optical components described herein as well as other optical components, or as any combination (i.e., sub-assembly) of optical components described herein as well as other optical components.

In the illustrated implementation of a spectrograph, as one example, the first optic 22 may include a collimating optic, the second optic 24 may include a dispersive optic, and the third optic 26 may include a focusing optic. The first optic 22 may include a collimating lens, for example, or any other suitable collimator (such as a collimating mirror) and may be achieved with a single optic or an arrangement of multiple optics. The second optic 24 may include a diffraction grating (which may also be referred to as a grating), for example, or any other suitable dispersive optic and may be achieved with a single optic or an arrangement of multiple optics. The third optic 26 may include a focusing lens, for example, or any other suitable focusing optic (such as a focusing mirror) and may be achieved with a single optic or an arrangement of multiple optics. In some examples, the third optic may include a detector/camera, such as the detector 20, which may include a focusing lens. The optical arrangement 16 may additionally include an entrance aperture 30, the exit aperture 18, and/or the detector 20. The optical arrangement 16 may have transmission optics, reflective optics, or a combination of both. In the optical arrangement 16 shown in FIG. 1, the dispersive optic (i.e., the second optic 24) is used in the transmission mode. In some examples, the dispersive optic (i.e., the second optic 24) may be used in the reflective mode. For example, a monochromator for use in a spectrograph using reflective optics is disclosed in U.S. Pat. No. 7,345,760 issued on Mar. 18, 2008, the contents of which are incorporated herein by reference.

The optical arrangement 16 may be defined to include any one or more of the entrance aperture 30, first optic 22, the second optic 24, the third optic 26, the exit aperture 18, and/or the detector 20, in any combination, and need not include all of the entrance aperture 30, first optic 22, the second optic 24, the third optic 26, the exit aperture 18, and the detector 20. The optical arrangement 16 may be defined to include more than three optics.

The mounting system 14 includes a base 32, a first adjustable mount 36, a second adjustable mount 38, and a third adjustable mount 34. The terms "first," "second," and "third" are used consistently in this detailed description, but it should be understood that the order is not to be regarded as limiting; the mounting system 14 may include only one of the mounts, only two of the mounts, or more than three mounts. The base 32 may be configured as a plate that is planar (as illustrated) and may be generally planar having some deviations from planar, such as steps, curves, and/or slopes. The base 32 may typically be oriented horizontally with respect to gravity during use as illustrated, though the base 32 may have other orientations such as vertical, oblique, etc., in other implementations or uses. The first optic 22, the second optic 24, and the third optic 26 are each supported by and mounted with respect to the base 32.

"Mounted with respect to" may include directly mounted to the base 32, e.g., by way of a mount, or indirectly mounted to the base 32, e.g., by way of one or more intermediate members such as a bracket, a link, a linkage, etc. between the base 32 and the mount. In the illustrated implementation, the base 32 fixedly supports the first optic 22. The first adjustable mount 36, the second adjustable mount 38, and the third adjustable mount 34 are each movably mounted with respect to the base 32, each being adjustable independently of the others (i.e., each being adjustable in a different way from the others). In the illustrated implementation, the third adjustable mount 34 supports the second optic 24 and is configured to allow the second optic 24 to rotate about a central axis C. The central axis C is defined through the second optic 24 (e.g., normal to a plane defined by the second optic 24 and through an approximate center defined within a circumference of the second optic 24) and is parallel to the base 32 (e.g., horizontal). In the illustrated implementation, the second optic 24 has a substantially circular outer circumference encircling a generally planar disc of material having gratings, though other shapes and configurations are possible in other implementations. In the illustrated implementation, the first adjustable mount 36 supports the third adjustable mount 34; as such, the second optic 24 is independently movable about two different axes, one provided by the third adjustable mount 34 and the other provided by the first adjustable mount 36. The second adjustable mount 38 supports the third optic 26. The first adjustable mount 36 and the second adjustable mount 38 are independently pivotable about coincident first and second pivot axes illustrated as a pivot axis P. The pivot axis P is normal (or perpendicular) to the base 32 and perpendicular to the central axis C. The pivot axis P also intersects the second optic 24, and more specifically intersects the central axis C of the second optic 24. The pivot axis P is also generally parallel to the plane of the second optic 24. In some implementations, the respective first and second pivot axes of the second and third adjustable mounts 36, 38 are substantially coincident. "Substantially coincident" includes coincident and approximately coincident (e.g., disposed within 10 mm of each other in some implementations, or within 5 mm of each other in some implementations).

In the illustrated implementation, as one example, the first optic 22 is fixedly mounted with respect to the base 32, the second optic 24 is supported by the first adjustable mount 36 and the third adjustable mount 34, and the third optic 26 is supported by the second adjustable mount 38. This arrangement is one example how a relative position between the first optic 22 and the second optic 24 is adjustable, a relative position between the second optic 24 and the third optic 26 is adjustable, and the second optic 24 is independently rotatable about its central axis C. However, in other implementations, any one of the first, second, or third optics 22, 24, 26 may be fixedly mounted with respect to the base 32, while the remaining two are movably mounted in order to achieve the same relative adjustability. In in any implementation, there need not be a fixed optic; it is possible that each of the first, second, and third optics 22, 24, 26 is movably mounted with respect to the base 32. For example, it may further be desirable to adjust a position of the first optic 22 with respect to the light L entering the adjustable optical system 12.

In the illustrated example, rotation of the second optic 24 about the central axis C achieves adjustment of a ruling angle R (FIGS. 3-4) of the second optic 24 (e.g., dispersive optic, such as a diffraction grating having parallel rulings/ slits). For example, it may be desirable for the rulings (not shown) to be aligned perpendicular to an axis of a line sensor (e.g., the detector 20). The rulings may be adjusted to be normal to the base 32 (e.g., vertical) for optimal calibration of the optical system 12. When properly aligned, at least one of the rulings (not shown) of the second optic 24 may be parallel to or coincident with the pivot axis P.

In the illustrated example, pivoting the second optic 24 about the pivot axis P achieves adjustment of an incidence angle A between the first optic 22 and the second optic 24. The incidence angle A is the angle between a center ray W1 from the first optic 22 and a line normal to the surface of the second optic 24 (e.g., the central axis C), as illustrated in FIG. 2. However, as discussed above, other arrangements are possible in order to achieve adjustability of the incidence angle A. Adjusting the incidence angle A may help optimize the efficiency of the second optic 24 (e.g., efficiency of the diffraction grating).

In the illustrated example, pivoting the third optic 26 about the pivot axis P achieves adjustment of the third optic 26 and the detector 20 with respect to the second optic 24. For example, it may be desirable for the third optic 26 and the detector 20 to be aligned with a diffraction angle D corresponding to a wavelength of interest W2 diffracted by the second optic 24 (e.g., a grating transmission angle or a grating reflection angle). The diffraction angle D may be between the wavelength of interest W2 and a line normal to the surface of the second optic 24 (e.g., the central axis C), as illustrated in FIG. 2. The wavelength of interest W2 may be a single wavelength or a center wavelength in a range of wavelengths of interest and need not be the wavelength at the center of all the light dispersed from the second optic 24. The wavelength of interest W2 is determined by the user and depends on what information about the sample the user is seeking. For example, the user may choose a particular color range to be of particular interest. It may be desirable for the user to realign the adjustable optical system 12 in order to inspect a different wavelength of interest from the same sample, or from a different sample. The second optic 24 may be interchangeable with other second optics (not shown). Therefore, it may be desirable for the user to realign the adjustable optical system 12 when a new second optic (not shown) having different properties is inserted. However, as discussed above, other arrangements are possible in order to achieve adjustability of the alignment to the wavelength of interest W2. Additionally, the rotatability of the second optic 24 about the central axis C is advantageous when a new second optic is inserted in order to achieve fine adjustment of the ruling angle R.

Adjustment of the relative position between the first optic 22 and the second optic 24 (e.g., of the incidence angle A) may be manual, automatic, or semi-automatic. Similarly, adjustment of the relative position between the second optic 24 and the third optic 26 (e.g., of the alignment of the third optic 26 to the wavelength of interest W2 from the second optic 24) may be manual, automatic, or semi-automatic. Adjustment may be achieved using actuators 40a-40d configured to manually, automatically, or semi-automatically move the first adjustable mount 36 and the second adjustable mount 38. In the illustrated implementation, adjustment is achieved using first and second actuators 40a, 40b configured to move the first adjustable mount 36 about the pivot axis P and third and fourth actuators 40c, 40d configured to move the second adjustable mount 38 about the pivot axis P. The actuators 40a-40d may be linear actuators or non-linear actuators, and any number of actuators may be employed. For example, in other implementations, a single rotatable actuator may be employed to rotate the first adjustable mount 36 and/or the second adjustable mount 38 about the pivot axis P.

The actuators 40a-40d may be mechanical actuators, electro-mechanical actuators, hydraulic actuators, pneumatic actuators, piezoelectric actuators, etc. In the illustrated implementation, as one example, each of the actuators 40a-40d includes a fine pitch screw 42 configured to move linearly with respect to a housing 44 that is fixed with respect to the base 32. The fine pitch screw is actuatable manually (e.g., by a tool such as a hex screwdriver or a hex key, not shown). Each of the actuators 40a-40d also includes a biasing member 46 (e.g., a tension spring) coupled to and configured to pull the respective movable mount 36, 38 towards the respective housing 44. However, in other implementations, other types of actuators may be employed, such as threadless linear actuators (e.g., having angled ball bearings configured to move a shaft threadlessly), or any other type of linear or non-linear actuator.

Figure 5:
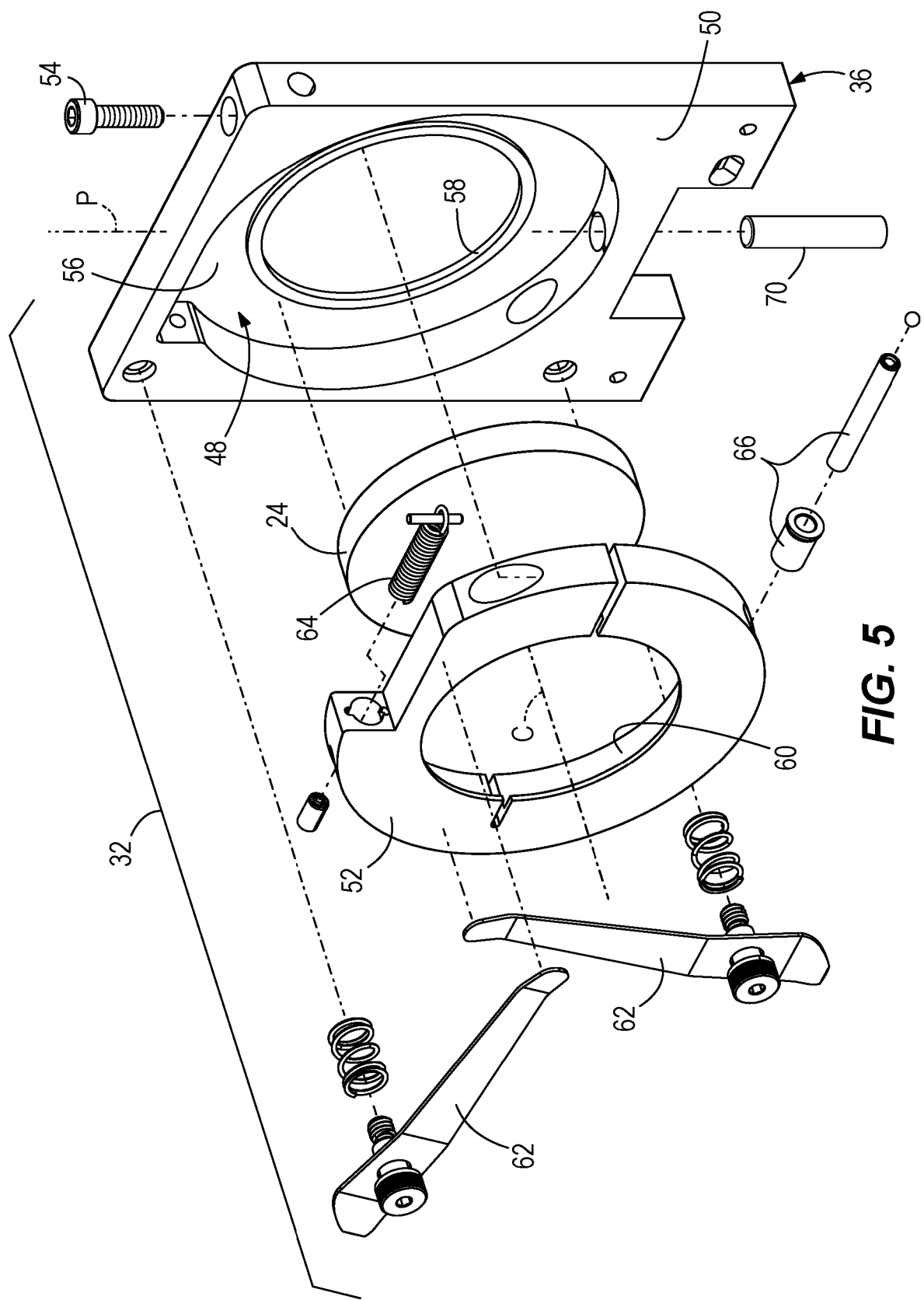
FIG. 5 is rear perspective exploded view of the grating mounting system shown in FIG. 3.

As illustrated in FIGS. 3-5, the third adjustable mount 34 includes a rotation bracket 52 configured to be movably (e.g., rotatably) received in a recess 48. The recess 48 is configured to receive the second optic 24, which is supported by the rotation bracket 52. In the illustrated implementation, the recess 48 is disposed in a first pivot bracket 50 defining the first adjustable mount 36, though the recess 48 may be disposed in a separate piece in other implementations (e.g., may be completely independent from the first adjustable mount 36 in other implementations).

The second optic 24 is received in the rotation bracket 52 and secured to the rotation bracket 52 by way of a clamping fastener 54 configured to tighten the rotation bracket 52 around the second optic 24. The rotation bracket 52 may be C-shaped to allow adjustment of the clamping force by way of the clamping fastener 54. The rotation bracket 52, carrying the second optic 24, is received in the recess 48 and engages a flange 56 (e.g., the flange 56 of the first pivot bracket 50 or other bracket). The flange 56 has an aperture 58 therein for allowing transmission of incident light L through to the second optic 24. The rotation bracket 52 also has an aperture 60 therein for allowing transmission of the transmitted light L from the second optic 24. The third adjustable mount 34 may also include one or more clips 62 providing a clamping force in the direction of the central axis C to hold the rotation bracket 52 and the second optic 24 in the recess 48 against the flange 56.

The third adjustable mount 34 also includes a biasing member 64 (e.g., a tension spring) and an actuator 66. The biasing member 64 is configured to bias the rotation bracket 52 in a first rotational direction about the central axis C, while the actuator 66 is configured to push the rotation bracket 52 in a second rotational direction about the central axis C that is opposite the first rotational direction. As such, a rotatable position of the second optic 24 about the axis C (i.e., adjustment of the ruling angle R) is controlled by the position of the actuator 66. The actuator 66 may include a fine pitch set screw (as illustrated), which is set in the rotation bracket 52, or may include any other suitable type of linear actuator in other implementations. The actuator 66 is configured to move linearly with respect to the base 32. In the illustrated implementation, the actuator 66 is actuatable (e.g., rotatable) manually, e.g., by a tool such as a hex screwdriver or a hex key, not shown. This mechanism gives fine angular control with a few degrees of angular range, e.g., 4 degrees of angular control at a rate of about 0.02 inches (+/−0.01 inches) (about 0.51 mm) of linear movement of the actuator 66 per degree of angular control, e.g., achieved using about 100 threads per inch (+/−5) for fine adjustment. However, other threads per inch may be employed to achieve other rates of angular control in other implementations. In yet other implementations, a non-linear actuator may be employed. In other implementations, other types of biasing members 64 and actuators 66 may be employed. The rotation bracket 52 may be rotationally mounted in other suitable ways and rotationally controlled using other suitable mechanisms. Adjustment of the ruling angle R may be manual, automatic, or semi-automatic.

The first adjustable mount 36 includes the first pivot bracket 50 pivotably mounted about the pivot axis P in any suitable fashion. For example, the first pivot bracket 50 may be supported by the base 32 and pivotably mounted to the base 32, e.g., by way of a dowel pin 70 (FIG. 5). The first pivot bracket 50 is thin enough to not significantly reduce the clear aperture of the second optic 24. The first adjustable mount 36 may be controlled by the first and second actuators 40a, 40b. The first actuator 40a is configured to pivot the first pivot bracket 50 about the pivot axis P in a first direction, and the second actuator 40b is configured to pivot the first pivot bracket 50 about the pivot axis P in a second direction opposite the first direction. The first pivot bracket 50 supports the second optic 24, e.g., by way of the rotation bracket 52. A distance between the first optic 22 and the second optic 24 is fixed during adjustment of the relative position between the first optic 22 and the second optic 24.

The first adjustable mount 36 may be finely adjustable, e.g., 4 degrees of angular control at a rate of about 0.02 inches (+/−0.01 inches) (about 0.51 mm) of linear movement of the screw 42 in each of the actuators 40a, 40b per degree of angular control, e.g., achieved using about 100 threads per inch (+/−5) for fine adjustment. However, other threads per inch may be employed to achieve other rates of angular control in other implementations.

The second adjustable mount 38 includes a second pivot bracket 68 pivotably mounted about the pivot axis P in any suitable fashion. For example, the second pivot bracket 68 may be supported by the base 32 and pivotably mounted to the base 32, e.g., by way of the dowel pin 70, which may be the same dowel pin 70 used to mount the first pivot bracket 50, or a different dowel pin. The second pivot bracket 68 may include a generally planar plate or any other suitable shape or configuration. The second pivot bracket 68 supports the third optic 26, the detector 20, and the exit aperture 18 at a longitudinal end generally opposite the pivot axis P. A distance between the third optic 26 and the second optic 24 is fixed during adjustment of the relative position between the second optic 24 and the third optic 26.

The second adjustable mount 38 may be controlled by the third and fourth actuators 40c, 40d. The third actuator 40c is configured to pivot the second pivot bracket 68 about the pivot axis P in a first direction, and the fourth actuator 40d is configured to pivot the second pivot bracket 68 about the pivot axis P in a second direction opposite the first direction. The second adjustable mount 38 may be finely adjustable, e.g., 4 degrees of angular control at a rate of 0.1 to 0.2 inches (about 2.5 to 5.1 millimeters) of linear movement of the screw 42 in each of the actuators 40c, 40d) per degree of angular control, e.g., achieved using about 100 threads per inch (+/−5) for fine adjustment.

Figure 6:
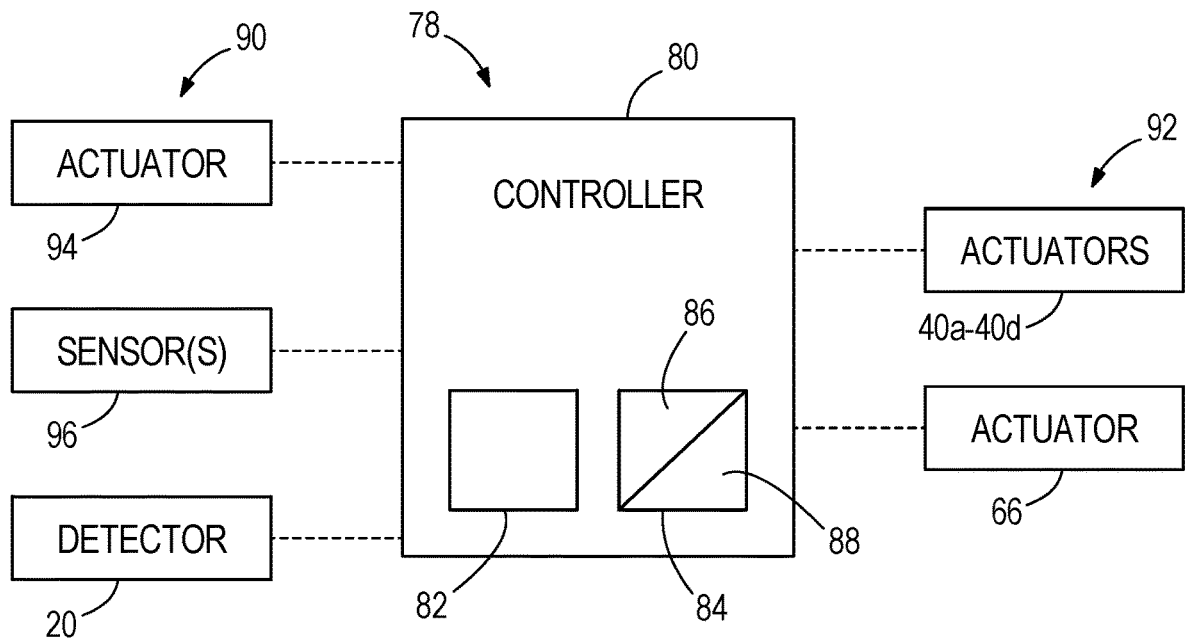
FIG. 6 is a schematic diagram of a control system for the adjustable optical system shown in FIG. 1.

In some implementations, the actuators 40a-40d and the actuator 66 may be controlled automatically or semi-automatically, e.g., by servomotors, other types of motors, or the like. Thus, the actuators 40a-40d and the actuator 66 may be electronically controllable. For example, as illustrated in FIG. 6, the adjustable optical assembly 12 may include a control system 78 having a controller 80 configured to perform the adjustments described above. The controller 80 may be part of the scientific instrument 10 or may be remote from the scientific instrument 10. The controller may be integrated or separate from the controller for the spectroscopic system, such as a Raman spectroscopic system.

As one example, the controller 80 may be configured to automatically or semi-automatically adjust positions of the third adjustable mount 34, the first adjustable mount 36, and the second adjustable mount 38. The controller 80 may include a programmable processor 82 (e.g., a microprocessor, a microcontroller, or another suitable programmable device) and a memory 84 such as a non-transitory memory. The memory 84 may include, for example, a program storage area 86 and a data storage area 88. The program storage area 86 and the data storage area 88 can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, electronic memory devices, or other data structures. The control system 78 may also, or alternatively, include integrated circuits and/or analog devices, e.g., transistors, comparators, operational amplifiers, etc., to execute the functionality described herein.

In some implementations, the controller 80 may include one or more inputs 90 and outputs 92 to and from various components, as illustrated in FIG. 6. The controller 80 may be configured to provide control signals to the outputs 92 and to receive data and/or signals (e.g., sensor data, user input signals, etc.) from the inputs 90. The one or more inputs 90 may include, but are not limited to, an actuator 94, the detector 20, and one or more sensors 96, such as position sensors configured to monitor the positions of the third adjustable mount 34, the first adjustable mount 36, and the second adjustable mount 38. The one or more outputs 92 may include, but are not limited to, each of the actuators 40a-40d (individually controllable) and the actuator 66, etc., and may include other components. Thus, the controller 80 may be programmed to automatically or semi-automatically control the position of the first mount 34, the second mount 36, and the third mount 38. For example, the controller 80 may be programmed to automatically or semi-automatically adjust the ruling angle R, the incidence angle A, and the alignment to the wavelength of interest W2. The controller 80 may be programmed to adjust the ruling angle R, the incidence angle A, and the alignment to the wavelength of interest in response to the user activating the actuator 94. For example, the scientific instrument 10 may include the actuator 94, such as a button, that the user can actuate in order to have the control system 78 automatically or semi-automatically adjust the adjustable optical system 12.

Figure 7:
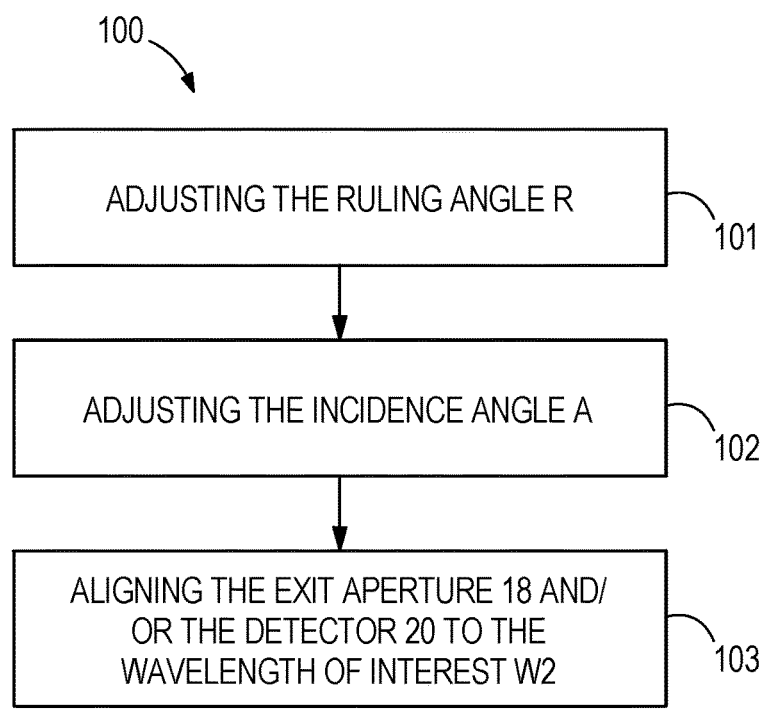
FIG. 7 is a method flow chart in accordance with the present disclosure.

FIG. 7 illustrates a method 100 of adjusting the alignment of the optical arrangement 16 in a spectrograph. The method may include any one or more of steps 101-103, amongst other additional and intermediary steps apparent from the disclosure, in any combination. At step 101, the method 100 includes adjusting the ruling angle R of the second optic 24 via the third adjustable mount. In one example, the ruling angle R is adjusted by rotating the second optic 24 about its central axis C (which can be achieved in any way disclosed herein). Step 101 may include determining a desired position of the ruling angle R. In one example, determining a desired position of the ruling angle R includes passing a predetermined spectrum of light through the second optic 24 (and through the entire optical arrangement 16) and observing the detector 20 while adjusting the ruling angle R. For example, the predetermined spectrum of light may include monochromatic light or white light. Step 101 may also include using the detector 20 to determine when the ruling angle R has reached the desired position. For example, to find the desired ruling angle R, the predetermined spectrum of light is viewed on the detector 20 (e.g., a two-dimensional detector such as a line sensor) and a determination can be made (either automatically by the controller 80, manually by the user, or semi-automatically) when the predetermined spectrum of light casts a stripe along the detector 20 that is parallel to a longitudinal axis the detector 20. When the stripe is parallel, then the desired (or optimal) ruling angle R has been reached and adjustment can stop. In another example, step 101 may additionally or alternatively include removing the third optic 26 and the detector 20 (e.g., by removing the second adjustable mount 38) and measuring the relative height of the zeroth and first diffraction orders. When the heights are equal then the ruling angle R has reached the desired position and adjustment can stop. Other methods for calibrating the ruling angle R are possible. In other implementations, step 101 may additionally or alternatively include using one or more of the position sensors 96.

At step 102, the method 100 includes adjusting the incidence angle A. The incidence angle A may be adjusted by adjusting the relative position between the first optic 22 and the second optic 24 (which can be achieved in any way disclosed herein). Step 102 may also include determining a desired incidence angle A by passing the predetermined spectrum of light through the second optic 24 (and through the entire optical arrangement 16) and observing the detector 20 while adjusting the relative position. Either automatically by the controller 80, manually by the user, or semi-automatically, the intensity of a first order diffraction peak may be observed on the detector 20 and, when the intensity is maximized, then the desired incidence angle A is determined (e.g., the optimized incidence angle A) and adjustment can stop. Other methods for calibrating the incidence angle A are possible. In other implementations, step 102 may additionally or alternatively include using one or more of the position sensors 96.

At step 103, the method 100 includes aligning the exit aperture 18 and/or the detector 20 the wavelength of interest by adjusting the relative position between the second optic 24 and the third optic 26 (which can be achieved in any way disclosed herein). (Since the third optic 26 is fixed in position relative to the exit aperture 18 and the detector 20 in the illustrated implementation, the relative position between the second optic 24 and the third optic 26 may also be referred to as the relative position between the second optic 24 and the exit aperture 18 and/or the relative position between the second optic 24 and the detector 20.) Step 103 may also include passing the predetermined spectrum of light through the second optic 24 (and through the entire optical arrangement 16) and observing the detector 20 while adjusting the relative position. Aligning the exit aperture 18 and/or the detector 20 with respect to the second optic 24 determines where different wavelengths of light land on the detector 20, so aligning allows the user (or the controller 80) to place the wavelength of interest W2 at a predetermined pixel of the detector 20. For example, it may be desirable to center a certain color, or other desired range of wavelengths, on the line sensor (i.e., on the detector 20). Either automatically by the controller 80, manually by the user, or semi-automatically, the alignment is calibrated to place the wavelength of interest W2 at the predetermined pixel of the detector 20. Other methods for calibrating the alignment to the wavelength of interest W2 are possible. In other implementations, step 103 may additionally or alternatively include using one or more of the position sensors 96.

Thus, the method 100 generally includes passing a predetermined spectrum of light through the scientific instrument 10 and onto the detector 20, and calibrating the rotational position of the second optic 24, a first relative position between the second optic 24 and the first optic 22, and a second relative position between the second optic 24 and the third optic 26, based on the detected spectrum.

The steps 101-103 may be performed in any order. The controller 80 may be programmed to execute each step of the method 100 in an open loop or closed loop control scheme. "Automatic," as used herein, may refer to a control scheme that requires no user intervention and is fully controlled by the controller 80. "Semi-automatic," as used herein, may refer to a control scheme that is programmed into the controller 80 and communicates with the outputs 92 but may accept some user input (e.g., as one of the inputs 90), such as a determination of when incident light on the detector 20 is optimized, desired, or displaying correctly (e.g., in the various ways described in the above method 100).

Further method steps, subsequent or intermediary, in the method 100 may be apparent from the above disclosure and the following description of operation. In operation, the user in the field may remove the second optic 24 and insert a different second optic (not shown) having different properties. To change the second optic 24, the user May 1) move the clips 62 off the rotation bracket 52, 2) remove the rotation bracket 52 and the second optic 24 from the recess 48 in the first pivot bracket 50, 3) loosen the clamping fastener 54, 4) remove the second optic 24 from the rotation bracket 52, 5) place a new second optic (not shown) in the rotation bracket 52, 6) tighten the clamping fastener 54, 7) insert the rotation bracket 52 and the new second optic into the recess 48, 8) move the clips 62 to hold the rotation bracket 52 in the recess 48, and 9) adjust the ruling angle R of the new second optic. Different diffraction gratings, for example, may have different incidence angles A and diffraction angles D for wavelengths of interest. For example, the user may need a different second optic 24 to look at a different region of the spectrum or use a different excitation laser.

The adjustable optical system 12 provides fine adjustment of the optical arrangement 16 in the field, which precludes the need for expensive high-precision machining and re-assembly of the optical arrangement 16. The adjustable optical system 12 also allows a single scientific instrument to be used for multiple applications, rather than being highly specialized for one application. Thus, the user may be able to use one scientific instrument 10 where, previously, multiple scientific instruments 10 were necessary. After swapping out the second optic 24, the user can re-calibrate the optical arrangement 16 in the field. The adjustable optical system 12 may also be useful during the initial manufacturing process of the scientific instrument 10, precluding the need for expensive high-precision machining and placement during initial assembly of the optical arrangement 16.

Thus, the disclosure provides, among other things, an adjustable optical system 12 for a scientific instrument 10 such as a spectrograph. Various features and advantages of the disclosure are set forth in the following claims.

In one implementation, the disclosure provides a spectrograph including a base, a first optic mounted with respect to the base, a second optic mounted with respect to the base, and a third optic mounted with respect to the base. A first relative position between the first optic and the second optic is adjustable about a first pivot axis. A second relative position between the second optic and the third optic is adjustable about a second pivot axis independently from the adjustability of the relative position between the first optic and the second optic. The second pivot axis is substantially coincident with the first pivot axis, and a distance between the third optic and the second optic is fixed during adjustment of the second relative position.

Additionally or alternatively, in any combination, the spectrograph may include: wherein the second optic defines a central axis normal thereto, wherein the second optic is configured to be rotatable about the central axis, wherein the central axis is parallel to the base, and wherein the first and second pivot axes are perpendicular to the central axis; wherein the central axis intersects the first axis and/or the second axis; wherein the central axis intersects the first axis and the second axis; wherein the first axis and the second axis intersect the second optic; a first adjustable mount being movable with respect to the base and configured to provide the adjustability of the relative position between the first optic and the second optic, and a second adjustable mount being movable with respect to the base, the second adjustable mount being movable independently of the first adjustable mount and configured to provide the adjustability of the relative position between the second optic and the third optic; at least one first actuator configured to move the first adjustable mount, and at least one second actuator configured to move the second adjustable mount, wherein the at least one first actuator and the at least one second actuator are actuatable automatically or semi-automatically by way of an electronic controller; wherein the first and second axes are coincident; and/or a detector mounted to be fixed relative to the third optic, wherein the third optic is configured to focus at least a portion of the light on the detector.

In another implementation, the disclosure provides a spectrograph. The spectrograph includes a base, a collimating optic supported by the base, a dispersive optic supported by the base, and a focusing optic supported by the base. A relative position between the collimating optic and the dispersive optic is adjustable by way of a first adjustable mount configured to be movable with respect to the base. A relative position between the dispersive optic and the focusing optic is adjustable by way of a second adjustable mount configured to be movable with respect to the base independently from the first adjustable mount.

Additionally or alternatively, in any combination, the spectrograph may include: wherein the dispersive optic defines a central axis normal thereto, wherein the dispersive optic is configured to be rotatable about the central axis by way of a third adjustable mount configured to be movable with respect to the base independently from the first and second adjustable mounts, wherein the central axis is parallel to the base, wherein the relative position between the collimating optic and the dispersive optic is adjustable about a pivot axis that is perpendicular to the central axis, and wherein the relative position between the dispersive optic and the focusing optic is also adjustable about the pivot axis; wherein the relative position between the collimating optic and the dispersive optic is adjustable about a pivot axis, wherein the relative position between the dispersive optic and the focusing optic is also adjustable about the pivot axis; wherein the pivot axis is perpendicular to the base; wherein the pivot axis intersects the dispersive optic; at least one first actuator configured to move the first adjustable mount, and at least one second actuator configured to move the second adjustable mount, wherein the at least one first actuator and the at least one second actuator each include a threaded screw; at least one first actuator configured to move the first adjustable mount, and at least one second actuator configured to move the second adjustable mount, wherein the at least one first actuator and the at least one second actuator are actuatable automatically or semi-automatically by way of an electronic controller; and/or a detector mounted to be fixed relative to the focusing optic, wherein the focusing optic is configured to focus at least a portion of the light on the detector.

In yet another implementation, the disclosure provides a method of adjusting the alignment of optics in a spectrograph. The method includes adjusting a first relative position between a dispersive optic and a collimating optic using a first adjustable mount, and adjusting a second relative position between a focusing optic and the dispersive optic using a second adjustable mount.

Additionally or alternatively, in any combination, the method may include: wherein adjusting the first relative position and adjusting the second relative position are performed automatically or semi-automatically using an electronic controller; passing a predetermined spectrum of light through the spectrograph and onto a detector, and calibrating the first relative position and the second relative position based on the detected spectrum.

What is claimed is:

1. A spectrograph comprising:
  a base;
  a first optic mounted with respect to the base;
  a second optic pivotably mounted with respect to the base via a first adjustable mount, wherein a first relative position between the first optic and the second optic is adjustable about a first pivot axis, and the second optic is rotatable relative to the first pivot axis by rotating the first adjustable mount; and
  a third optic mounted with respect to the base;
  wherein a second relative position between the second optic and the third optic is adjustable about a second pivot axis independently from the adjustability of the first relative position between the first optic and the second optic, wherein the second pivot axis is substantially coincident with the first pivot axis, wherein a distance between the third optic and the second optic is fixed during adjustment of the second relative position,
  wherein the second optic is independently movable, with respect to the first optic and the third optic, and wherein the second optic defines a central axis normal thereto, the second optic further supported by a third adjustable mount for rotating the second optic around the central axis.

2. The spectrograph of claim 1, wherein the first pivot axis and the second pivot axis are substantially normal to the base, wherein the central axis intersects the first pivot axis and/or the second pivot axis, wherein the central axis is parallel to the base, wherein the first and second pivot axes are perpendicular to the central axis.

3. The spectrograph of claim 1, wherein an electromagnetic radiation sequentially passes the first optic, the second optic, and the third optic.

4. The spectrograph of claim 1, further comprising:
  a second adjustable mount being movable with respect to the base, the second adjustable mount being movable independently of the first adjustable mount and configured to provide the adjustability of the second relative position between the second optic and the third optic, wherein the first optic is fixedly mounted to the base.

5. The spectrograph of claim 4, further comprising at least one first actuator configured to move the first adjustable mount, and at least one second actuator configured to move the second adjustable mount, wherein the at least one first actuator and the at least one second actuator are actuatable automatically or semi-automatically by way of an electronic controller.

6. The spectrograph of claim 4, wherein the second adjustable mount is a plate having an elongated shape defined by a length and a width, and wherein the third optic is mounted at one end of the second adjustable mount along the length, and an opposite end of the second adjustable mount along the length is pivotably mounted to the base at the second pivot axis.

7. The spectrograph of claim 1, further comprising a detector mounted to be fixed relative to the third optic, wherein the third optic is configured to focus at least a portion of light on the detector.

8. The spectrograph of claim 1, wherein the third adjustable mount includes an actuator configured to control a rotatable position of the second optic about the central axis.

9. The spectrograph of claim 1, wherein the third adjustable mount includes a bracket configured to support the second optic, and the second optic is mounted to the first adjustable mount via the third adjustable mount.

10. A spectrograph comprising:
  a base;
  a collimating optic mounted with respect to the base;
  a dispersive optic in a transmission mode and pivotably mounted with respect to the base via a first adjustable mount, wherein a first relative position between the dispersive optic and the collimating optic is adjustable about a first pivot axis, and the dispersive optic is rotatable relative to the first pivot axis by rotating the first adjustable mount;
  a focusing optic mounted with respect to the base;
  wherein a second relative position between the dispersive optic and the focusing optic is adjustable about a second pivot axis by way of a second adjustable mount configured to be movable with respect to the base independently from the first adjustable mount, wherein the second pivot axis is substantially coincident with the first pivot axis, and wherein a distance between the focusing optic and the dispersive optic is fixed during adjustment of the second relative position,
  wherein the dispersive optic defines a central axis normal thereto, the dispersive optic further supported by a third adjustable mount for rotating the dispersive optic around the central axis.

11. The spectrograph of claim 10, wherein the third adjustable mount is configured to be movable with respect to the base independently from the first and second adjustable mounts.

12. The spectrograph of claim 10, wherein the base includes a base plate, and wherein the first and second pivot axes are perpendicular to the base plate.

13. The spectrograph of claim 10, wherein the first relative position between the collimating optic and the dispersive optic is adjustable about a pivot axis, wherein the second relative position between the dispersive optic and the focusing optic is also adjustable about the pivot axis.

14. The spectrograph of claim 10, wherein the first adjustable mount is adjusted so that an incidence angle of an electromagnetic radiation on the collimating optic is adjusted.

15. The spectrograph of claim 10, wherein the first pivot axis extends along the dispersive optic.

16. The spectrograph of claim 10, further comprising at least one first actuator configured to move the first adjustable mount, at least one second actuator configured to move the second adjustable mount, at least one third actuator configured to control a rotatable position of the dispersive optic, wherein the at least one first actuator, the at least one second actuator, and the at least one third actuator each include a threaded screw.

17. The spectrograph of claim 10, further comprising a detector mounted to be fixed relative to the focusing optic, wherein the focusing optic is configured to focus at least a portion of light on the detector.

18. A method of adjusting an alignment of optics in the spectrograph of claim 10, the method comprising:
- adjusting the first relative position between the dispersive optic and the collimating optic using the first adjustable mount; and
- adjusting the second relative position between the focusing optic and the dispersive optic using the second adjustable mount.

19. The method of claim 18, wherein adjusting the first relative position and adjusting the second relative position are performed automatically or semi-automatically using an electronic controller.

20. The method of claim 18, further comprising:
- passing a predetermined spectrum of light through the spectrograph and onto a detector, and
- calibrating the first relative position and the second relative position based on a detected spectrum of light.

* * * * *